(12) United States Patent
Lenders et al.

(10) Patent No.: US 8,336,388 B2
(45) Date of Patent: Dec. 25, 2012

(54) METHODS AND STRUCTURES FOR MONITORING OFFSHORE PLATFORM SUPPORTS

(75) Inventors: Bernardino Lenders, Austin, TX (US); James Simpson Grant, Houston, TX (US)

(73) Assignee: National Oilwell Varco, L.P., Houston, TX (US)

( * ) Notice: Subject to any disclaimer, the term of this patent is extended or adjusted under 35 U.S.C. 154(b) by 370 days.

(21) Appl. No.: 12/868,873

(22) Filed: Aug. 26, 2010

(65) Prior Publication Data

US 2012/0050056 A1 Mar. 1, 2012

Related U.S. Application Data

(63) Continuation of application No. 12/284,886, filed on Sep. 25, 2008, now abandoned.

(60) Provisional application No. 60/997,784, filed on Oct. 5, 2007.

(51) Int. Cl.
*G01M 5/00* (2006.01)
(52) U.S. Cl. ......................................................... 73/786
(58) Field of Classification Search ............... 73/786
See application file for complete search history.

(56) References Cited

U.S. PATENT DOCUMENTS

| | | | | |
|---|---|---|---|---|
| 4,269,543 A | 5/1981 | Goldman et al. | ............ | 405/198 |
| 4,304,135 A | 12/1981 | Peterson et al. | ................ | 73/799 |
| 4,311,434 A | 1/1982 | Abe | | |
| 4,433,581 A | 2/1984 | Scott et al. | ...................... | 73/786 |
| 4,495,824 A | 1/1985 | Dantan | ....................... | 73/862.64 |
| 4,587,854 A | 5/1986 | Fry | .............................. | 73/862.31 |
| 4,657,438 A | 4/1987 | Gillis | ............................ | 405/198 |
| 4,813,814 A | 3/1989 | Shibuta et al. | ................ | 405/198 |
| 4,885,698 A | 12/1989 | Kawasaki | ...................... | 364/506 |
| 5,139,366 A | 8/1992 | Choate et al. | ................ | 405/198 |
| 5,611,645 A | 3/1997 | Breeden | ........................ | 405/196 |
| 5,622,452 A | 4/1997 | Goldman | ...................... | 405/198 |
| 5,833,396 A | 11/1998 | Thomas | ........................ | 405/198 |
| 5,906,457 A | 5/1999 | Choate et al. | ................ | 405/198 |
| 5,975,805 A | 11/1999 | Morvan et al. | ................ | 405/198 |
| 5,975,806 A | 11/1999 | Delamatyr | .................... | 405/198 |

(Continued)

FOREIGN PATENT DOCUMENTS

EP 0086142 A 8/1983

(Continued)

OTHER PUBLICATIONS

Artymiuk et al., "New Combined Drilling, Workover and Snubbing Rig Concept," *Wiertnictwo Nafta Gaz, Tom* 23/1, pp. 69-78 (2006).

(Continued)

*Primary Examiner* — Freddie Kirkland, III
(74) *Attorney, Agent, or Firm* — Jeffery E. Daly; JL Salazar Law Firm

(57) ABSTRACT

A method for monitoring a leg of an oilfield platform, the platform having a plurality of legs, each leg with a plurality of chords, each chord with a corresponding rack, the platform including a rack-and-pinion leg jacking system with a motor and gear system with pinions for jacking the legs up. The method, in certain aspects, including providing a load monitor with a strain sensing apparatus on a selected pinion of each rack-and-pinion system, providing a rack path differential monitoring system for monitoring rotation of the selected pinions to provide an indication of a linear displacement of the selected pinions for comparison to indicate rack path differential for racks of the legs of the platform.

26 Claims, 9 Drawing Sheets

U.S. PATENT DOCUMENTS

| | | | | |
|---|---|---|---|---|
| 6,076,996 | A | 6/2000 | Choate et al. | 405/198 |
| 6,443,660 | B1 | 9/2002 | Smith et al. | 405/224 |
| 7,007,769 | B2 | 3/2006 | Hara et al. | 180/402 |
| 7,011,471 | B2 | 3/2006 | Ingle | 405/198 |
| 7,112,010 | B1 | 9/2006 | Geiger | |
| 7,163,355 | B2 | 1/2007 | Ingle et al. | 405/198 |
| 7,186,061 | B2 * | 3/2007 | Foo et al. | 405/198 |
| 7,234,409 | B2 | 6/2007 | Hansen | |
| 7,404,443 | B2 | 7/2008 | Patton et al. | 166/355 |
| 7,456,515 | B2 | 11/2008 | Nielsen | |
| 8,146,418 | B2 * | 4/2012 | Foo et al. | 73/170.32 |
| 2004/0240947 | A1 | 12/2004 | Wetch | 405/224.2 |
| 2008/0284886 | A1 | 9/2008 | Bernardino et al. | |
| 2009/0087311 | A1 | 4/2009 | Wyborn | |
| 2009/0090191 | A1 * | 4/2009 | Lenders et al. | 73/786 |

FOREIGN PATENT DOCUMENTS

| | | |
|---|---|---|
| GB | 2 177 978 | 2/1987 |

OTHER PUBLICATIONS

International Search Report for counterpart PCT Patent Application No. PCT/GB2008/050884, dated Jan. 20, 2009, 3 pages.

Written Opinion for counterpart PCT Patent Application No. PCT/GB2008/050884, dated Jan. 20, 2009, 6 pages.

Notification of First Office Action for counterpart Chinese Application No. 200880110169.5, dated Feb. 14, 2011, 2 pages.

Examination Report for counterpart Singaporean Patent Application No. 20102343-0 dated Jun. 12, 2012, 4 pages.

* cited by examiner

FIG. 6A
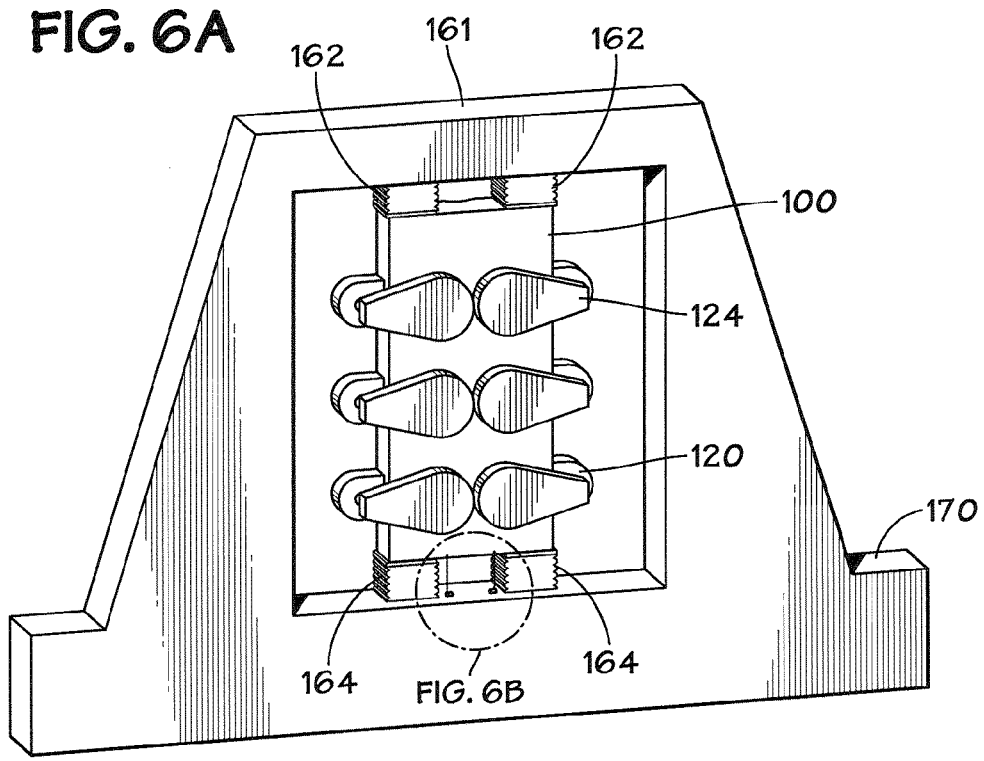
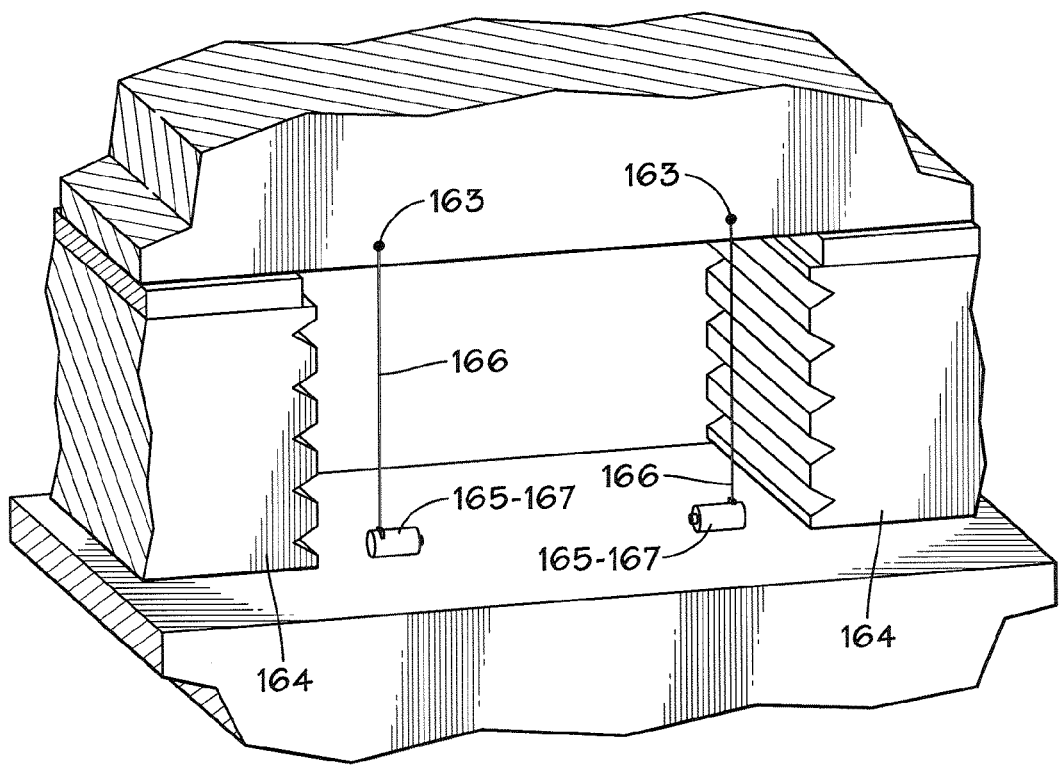
FIG. 6B

METHODS AND STRUCTURES FOR MONITORING OFFSHORE PLATFORM SUPPORTS

CROSS REFERENCE TO RELATED APPLICATIONS

This application is a continuation of U.S. patent application Ser. No. 12/284,886, filed on Sep. 25, 2008, now abandoned, which claims the benefit of Provisional Patent Application Ser. No. 60/997,784, filed on Oct. 5, 2007.

BACKGROUND OF THE INVENTION

1. Field of the Invention

The present invention is directed to systems and methods for monitoring offshore platform supports, and, in certain particular aspects, to systems and methods for monitoring rack path differential of jack-up platform legs and loading on the legs.

2. Description of Related Art

Offshore platforms and rigs for well operations, some of which are called "jack-up platforms," are floating vessels with legs driven by jacking units extending down and contacting the sea floor. A "jackup" rig or platform is any self-elevating offshore platform or deck with one or more legs, each leg consisting of one or more chords, used for any of a variety of operations, including, but not limited to, drilling, production, workover, or other offshore operations or work, which has the ability of being supported on jackable leg(s) to the seafloor, optionally with the capability of relocating from one offshore location to another by lowering to an afloat position, being moved to a new offshore position, and raising itself again to an elevated position. Such "off-shore" rigs and platforms are well-known and typically include a drilling rig or "hull" generally mounted on multiple legs, e.g. three or more legs, each provided with a base forming a supporting foot ("spud can" of the leg). In certain systems, each has one or more chords structurally connected to each other forming one unit (a "leg"). Legs with one to four chords are now in use. Each chord has one or two (opposite to each other) racks. Each rack is driven by one or more pinions. The rig or platform is positioned at a desired site, and then raised to an operational height above the sea. Motorized displacement ("jacking") of the rig along each of its legs raises the rig. Each a leg can be raised independently of the other legs to a certain extent, so that an operator can, for example, correct uneven penetration of the legs into the sea bed.

The rig is raised or lowered in relation to each leg by the sets of racks-and-pinions driving each leg, the systems generally with three legs being arranged in each angle or corner of a triangular structure with three metal chords and struts ("chord" designating each "member" of each leg). The jacking system of this type includes at least one elongated rack which is mounted vertically on the exterior side surface of the upright legs and extends substantially through the entire length of the same, and a plurality of cooperating pinions engaged with each of the racks. Each of pinions is driven through a series of reduction gears by means of a respective motor. When the platform is supported by the upright legs on the sea floor, this support is effected by the engagement of the rack with the pinion of the jacking system. In this manner, during offshore operations the load which is composed of the self-weight of the platform and environmental forces such as wind, wave, current and others is placed on the jacking system in engagement of the rack with the pinion.

When the position of a given leg is changed, the pinions relating to this leg are in operation simultaneously, in the same direction and with the same theoretical speed. The speed of linear displacement depends on the load on the leg. When a leg is inclined, the least-loaded chord is raised more quickly than the others by its motors, resulting in an additional increase in "Rack Path Difference" or rack phase differential (or "RPD") on the leg concerned. The relative position of the rig (hull) and of the legs (geometry of the system) in relation to the sea bed is, in many prior systems, checked in relation to two series of fixed reference points, which are the bottom of the hull of the rig and the top of the "jacking structure" or "jacking house".

Correct positioning can be inhibited by many factors: e.g. incorrect positioning by an operator; the existence or appearance of major lateral stresses or loads, such as those due to currents, swell and/or wind; uneven embedding of the feet of the legs; heterogeneous or inclined ground; or to an operating fault on a lifting motor or brake. Often it is difficult to determine which factors are involved. Excessive stresses on the structure and particularly on the legs, with the risk of damage to the legs, can lead to rig down time and a significant reduction of the service life of the rig.

"Rack Path Differential" (difference for a given rack path, i.e. geometrical difference in the structure for a given number of rack notches) is a horizontality defect. Normally, when the rig is on site, the legs are lowered until their tips are resting on the sea bed, then the rig is raised out of the water up to its operating position. This involves a certain penetration of the tips into the sea bed, according to the nature of the bed, but normally the legs remain vertical and the only forces acting on the unit remain within the strength limits selected when designing the rig. However, in certain cases, the sea bed may be inclined or uneven, etc., which can cause a horizontal deviation, a deviation of one or more legs in relation to the vertical, which creates a bending moment on the leg or legs concerned. These deviations, if they affect two or three legs, are not necessarily parallel to each other, which can complicate the problem. Such bending causes the load to become unequal on the three chords of the leg concerned, the leg being in a skewed position with respect to its guide. The imbalance can be such that it is no longer possible to move the rig. The rig then has to be lowered again to water level, to a floating state to eliminate the load, the supporting legs are withdrawn from the sea bed over a part of the penetration obtained, and then the jacking operation is recommended. This may possibly be combined, according to the seriousness of the situation, with a slight shift of position in order to avoid the first footprints, although such an operation is not generally recommended, and with a backward and forward movement of the legs such as reaming to correct the deviation. Such action is obviously time consuming and is not always successful. In certain severe situations, a decision has to be made to move the rig from the planned drilling point to another location 50 to 100 meters away, and to recommence the operation, with the same uncertainties. This latter solution is impossible to implement when the rig has to be located alongside a fixed production platform. In such a case, only a margin of a small distance is available for jacking up the rig.

There has long been a need, recognized by the present inventors, for effective and efficient systems and methods for both monitoring loads on rig legs and for monitoring changes in position of the legs.

BRIEF SUMMARY OF THE INVENTION

The present invention, in at least certain aspects, discloses systems and methods for simultaneously monitoring the rack path differential of chords of a platform's legs and for monitoring the load on each of the legs. In certain aspects, sudden changes in leg position are detected.

In certain aspects, the present invention discloses a load monitoring system and a rack path differential monitoring system for jacking systems for, including floating jacking systems.

In certain particular aspects the present invention discloses a leg load monitoring system in which a shaft of a rack-and-pinion gear system has one or more strain sensors thereon, information from which is transmitted to a control system (e.g. any suitable computer system or programmable logic controller or "PLC").

In certain aspects, the present invention discloses load monitoring systems ("PLMS" means pinion load monitoring system) and rack path differential reading apparatus for jacking systems of the rack and pinion type. A pinion shaft, within a gear train, is provided with strain sensing components and a series of sensors are provided to measure the rotational amount and directional displacement of the same or another shaft arrangement. The information gathered from the strain measurements of a shaft, while static or in motion, is transmitted to a static connection in a junction box by means of a slip ring while the rotational measurement, being received on a static connection, is also directed to a junction box. All the information collected is fed into a computer (e.g. a PLC), optionally with displays located in or near the jacking system console. Variations in the readings greater than specified, trigger a visual and/or sound alarm, requiring attention of the operator to effect corrections to the loadings and/or positioning of an individual drive or a jack unit.

In certain particular aspects, in the case of "floating jacking systems," certain systems according to the present invention include an additional measurement of the vertical displacement of the jack unit in relation to the platform accomplished by means of a distance measurement device (see, e.g., devices D, FIG. 10). The information collected from this measurement is combined with the information from the rotational readings and fed into a computer and processed.

The present invention, in certain aspects, discloses a rack path differential monitoring system which includes the detection of the relative position of each chord with respect to the deck of the platform for identifying possible twisting or skewing of the legs due to imbalanced loading or effects due to the conditions of the seafloor as mentioned above, and/or uneven displacement of the chords and/or legs with respect to the deck.

The present invention discloses, in certain aspects, methods for monitoring a load on a chord of a leg of an oilfield platform, the chord with a corresponding toothed rack, a rack-and-pinion leg jacking system for jacking the leg up or down, the rack-and-pinion leg jacking system with a motor, gear system with pinions, and a climbing pinion for meshing with the leg's toothed rack, the method including: providing for the selected chord at least one strain sensing apparatus on a selected pinion of the rack-and-pinion system associated with the selected chord; with the at least one strain sensing apparatus, sensing strain on the selected pinion, said strain indicative of load on the selected chord and on the selected chord's associated leg, and producing a signal indicative thereof; and transmitting said signal to a control system, and processing said signal producing a value of a load on the selected chord.

The present invention discloses, in certain aspects, a method for monitoring load on legs of an oilfield platform, and, therefore, total platform load, the platform having a plurality of legs, each leg with a plurality of chords, each chord with a corresponding toothed rack, a rack-and-pinion leg jacking system for each chord for jacking the legs up and down, each rack-and-pinion leg jacking system with at least one drive unit, each of the at least one drive unit having a motor, a gear system with pinions, and a climbing pinion for meshing with a corresponding toothed rack, the method including: providing a load monitor of each chord with at least one strain sensing apparatus on a selected pinion of a rack-and-pinion system leg jacking system of each chord, including a selected pinion for each of the at least one drive unit of each rack-and-pinion leg jacking system; with each said load monitor's at least one strain sensing apparatus, sensing strain on all the selected pinions, said strains indicative of load on the associated chord, and producing a signal indicative thereof for each chord of the leg, the signals including signals for each drive unit; transmitting said signals to a control system, and processing said signals producing a value of load on each leg, summing load on each leg providing load on the platform; within the control system, comparing the value of leg loads to a specified leg load values, and/or the total platform load to a specified value for total platform load; if any specified value is exceeded, producing an alarm for a system operator.

The present invention discloses, in certain aspects, system for monitoring load on a chord of a leg of an oilfield platform, the system including: a load monitor for each drive unit of the chord, with at least one strain sensing apparatus on a selected pinion of each drive unit for sensing strain on the selected pinion, said strain indicative of a load on the associated chord and producing signals indicative thereof; a control system; transmission apparatus for transmitting said signal to the control system; and the control system for processing said signals to produce a value of load on said chord.

The present invention discloses, in certain aspects, system for monitoring legs of an oilfield platform, the platform having a plurality of legs, each leg with a plurality of chords, each chord with a corresponding toothed rack, a rack-and-pinion leg jacking system for each chord for jacking the legs up and down, each rack-and-pinion leg jacking system with a plurality of drive units, each drive unit with a motor, gear system with pinions, and a climbing pinion for meshing with a toothed rack of a chord, the system including: a load monitor of each drive unit with at least one strain sensing apparatus on a selected pinion of the drive unit for sensing strain on the selected pinion, said strain indicative of load on the associated chord and producing signals indicative thereof; a control system; transmission apparatus for transmitting said signals to the control system; the control system for processing said signals to produce a value of leg load on each leg and platform load on the platform; and said control system for comparing said values to specified values for leg load and for platform load, and if said specified value is exceeded for either leg load or for platform load, the control system for producing an alarm for a system operator.

Accordingly, the present invention includes features and advantages which are believed to enable it to advance offshore rig and platform jacking system technology. Characteristics and advantages of the present invention described above and additional features and benefits will be readily apparent to those skilled in the art upon consideration of the following detailed description of preferred embodiments and referring to the accompanying drawings.

Unique, efficient, nonobvious systems and methods for effectively raising an offshore platform or rig are disclosed herein.

Such systems and methods which simultaneously provide monitoring of both leg rack path differential and leg loading.

Certain embodiments of this invention are not limited to any particular individual feature disclosed here, but include combinations of them distinguished from the prior art in their structures, functions, and/or results achieved. Features of the invention have been broadly described so that the detailed descriptions that follow may be better understood, and in order that the contributions of this invention to the arts may be better appreciated. There are, of course, additional aspects of the invention described below and which are included in the subject matter of this invention. Those skilled in the art who have the benefit of this invention, its teachings, and suggestions will appreciate that the conceptions of this disclosure may be used as a creative basis for designing other structures, methods and systems for carrying out and practicing the present invention.

The present invention recognizes and addresses the problems and needs in this area and provides a solution to those problems and a satisfactory meeting of those needs in its various possible embodiments and equivalents thereof. To one of skill in this art who has the benefits of this invention's realizations, teachings, disclosures, and suggestions, other purposes and advantages will be appreciated from the following description of certain preferred embodiments, given for the purpose of disclosure, when taken in conjunction with the accompanying drawings It will be understood that the various embodiments of the present invention may include one, some, or all of the disclosed, described, and/or enumerated improvements and/or technical advantages and/or elements in claims to this invention. Whereas the present invention has been described in particular relation to the drawings attached hereto, it should be understood that other and further modifications apart from those shown or suggested herein, may be made within the scope and spirit of the present invention.

BRIEF DESCRIPTION OF THE DRAWINGS

A more particular description of embodiments of the invention briefly summarized above may be had by references to the embodiments which are shown in the drawings which form a part of this specification. These drawings illustrate certain preferred embodiments and are not to be used to improperly limit the scope of the invention which may have other equally effective or legally equivalent embodiments.

FIG. 6A is a partial perspective view of the system of FIG. 6.

FIG. 6B is an enlargement of part of the system of FIG. 6A.

Figure 1:
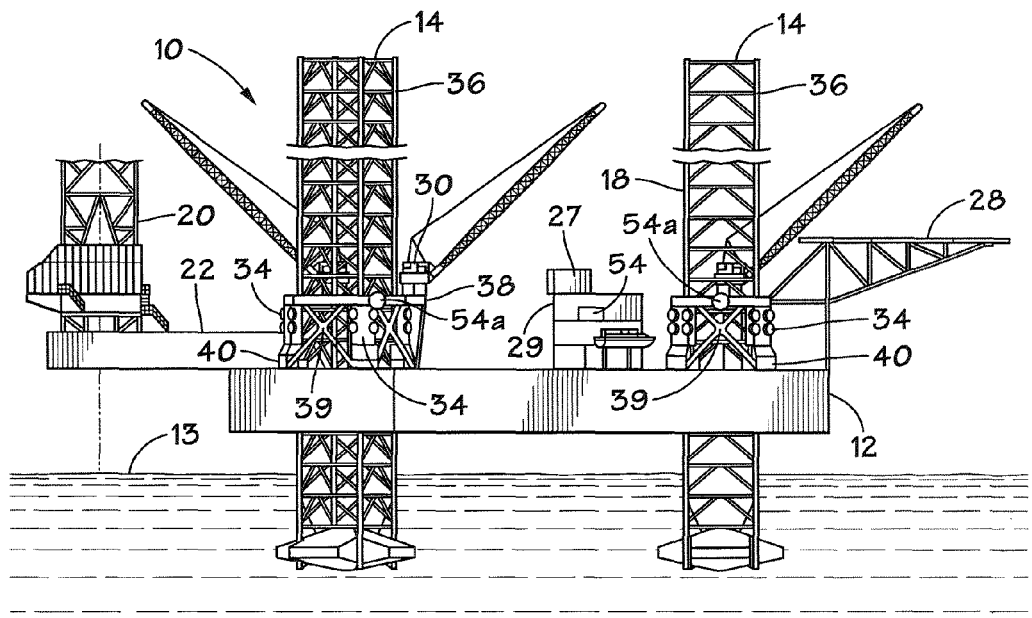
FIG. 1 is a side schematic view of a rig system according to the present invention.

Presently preferred embodiments of the invention are shown in the above-identified figures and described in detail below. Various aspects and features of embodiments of the invention are described below. Any combination of aspects and/or features described below can be used except where such aspects and/or features are mutually exclusive. It should be understood that the appended drawings and description herein are of preferred embodiments and are not intended to limit the invention. On the contrary, the intention is to cover all modifications, equivalents and alternatives falling within the spirit and scope of the invention. In showing and describing the preferred embodiments, like or identical reference numerals are used to identify common or similar elements. The figures are not necessarily to scale and certain features and certain views of the figures may be shown exaggerated in scale or in schematic in the interest of clarity and conciseness.

As used herein and throughout all the various portions (and headings) of this patent, the terms "invention", "present invention" and variations thereof mean one or more embodiment, and are not intended to mean the claimed invention of any particular embodiment. Accordingly, the subject or topic of each such reference is not automatically or necessarily part of, or required by, any particular embodiment merely because of such reference. So long as they are not mutually exclusive or contradictory any aspect or feature or combination of aspects or features of any embodiment disclosed herein may be used in any other embodiment disclosed herein.

DETAILED DESCRIPTION OF THE INVENTION

Figure 2:
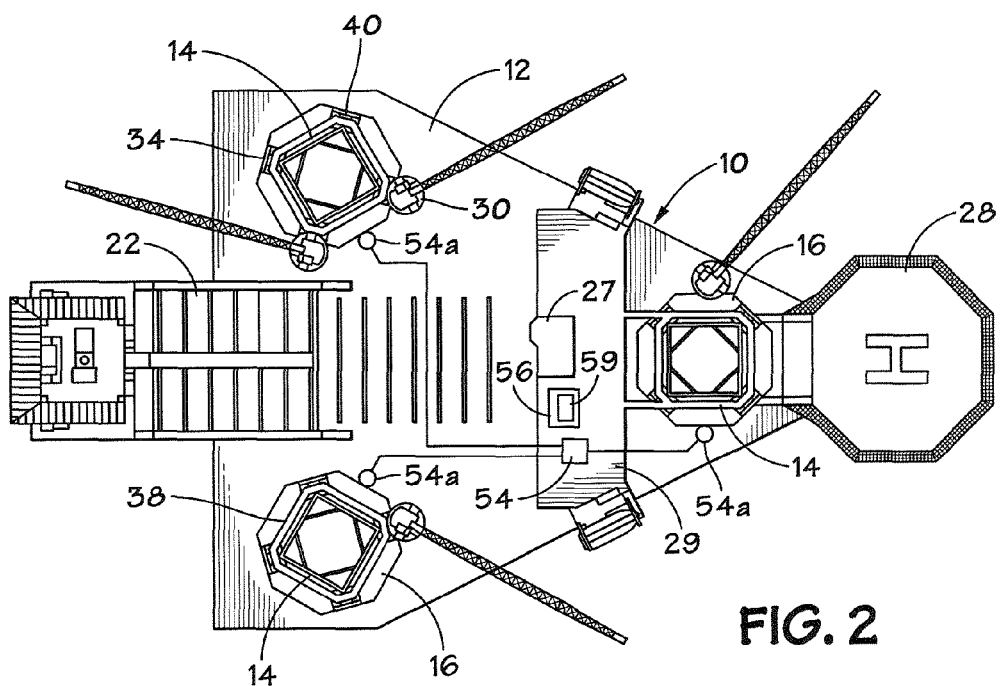
FIG. 2 is a top schematic view of the rig system of FIG. 1.

FIGS. 1 and 2 show a jackup rig 10 according to the present invention which includes a barge type hull 12 having at least one leg 14, here shown as three, which movably extend through the hull 12 within spud wells 16 with at least one set of rack teeth 18 attached to each of the legs 14. The hull 12 supports the legs 14 in an upright position. When the rig 10 arrives at its intended location, the legs 14 are lowered down until firmly engaged with the ocean floor. Continued jacking on the legs 14 lifts the hull 12 to a nominal height above the body of water 13 for preload operations. Upon the completion of preloading, jacking resumes until the bottom of the hull 12 reaches an elevation above the sea, e.g. greater than the highest wave height anticipated during a severe ocean storm. The main deck of the hull 12 may be outfitted with the necessary equipment to conduct operations, e.g. drilling, production or workover operations, such as a derrick 20, a cantilever beam and elevated pipe rack 22, pilot house 27, heliport 28, crew quarters 29, as well as general purpose cranes 30.

Figure 3:
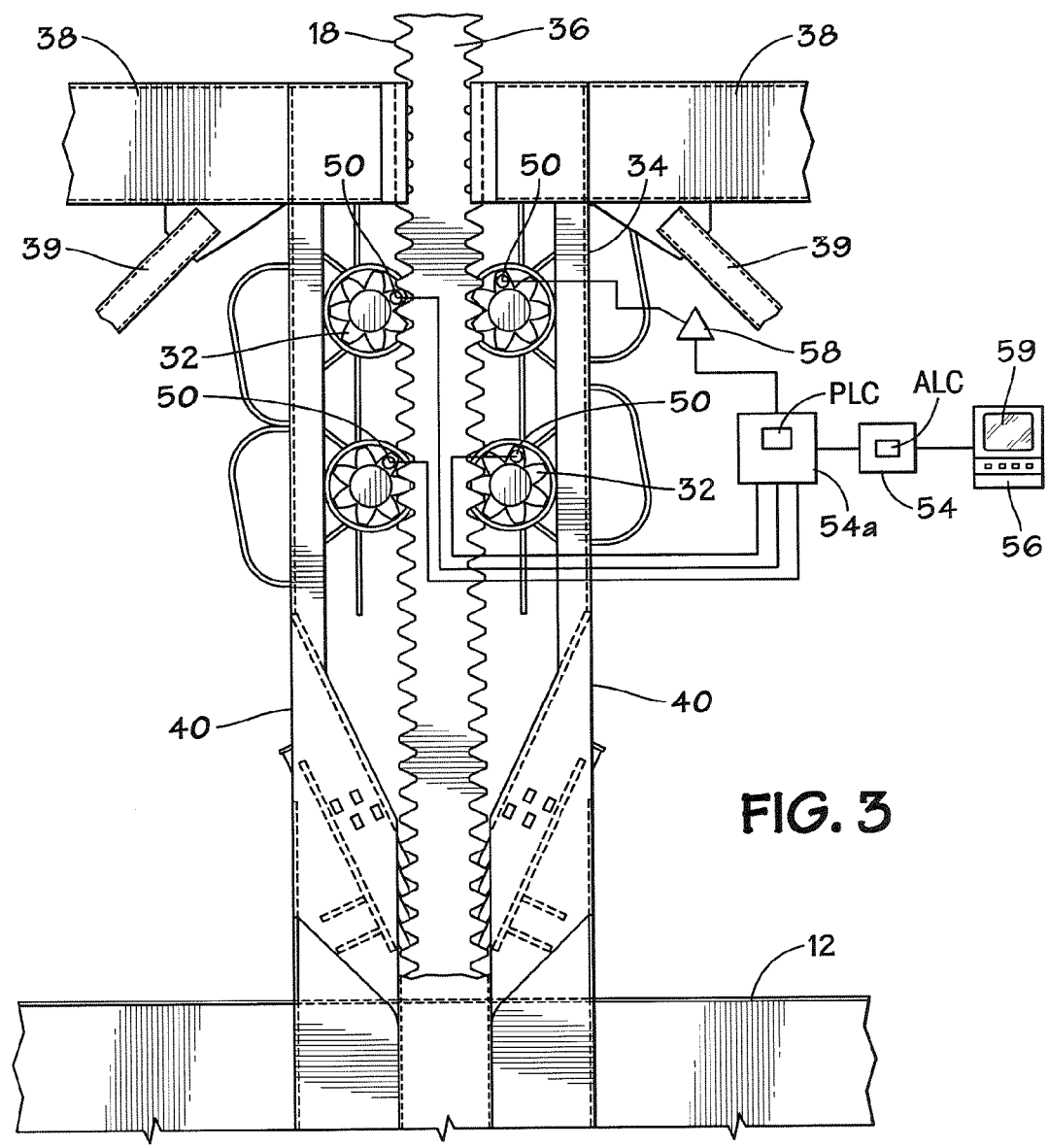
FIG. 3 is a side view of part of the system of FIG. 1.

Elevation of the hull 12 of the jackup rig 10 is achieved by a number of different techniques which are well known to the industry. One form of elevation system according to the present invention is useful with a rack and pinion elevating system according to the present invention. Elevating pinions 32 are housed in a jacking frame 34, on and within which is drive apparatus (electric or hydraulic) with a drive mechanism and a gear train (see FIGS. 3, 4) to drive the elevating pinions 32. The elevating pinions 32 engage the rack teeth 18 on a leg chord 36. Rotation of the pinions 32 in one direction moves the legs 14 upwardly relative to the hull 12, while rotation of the pinions 32 in the opposite direction lowers the legs 14 relative to the hull 12. An upper guide structure 38 is mounted above the jacking frame 34 and is used as an upper guide/support structure to control the position of the legs 14. The upper guide structure 38 is laterally supported back to the hull or deck 12 with brace beams 39. Each of the legs 14 have one or more generally vertically extending leg chords 36 which are structurally tied together by suitable bracing. For the embodiment shown, rack teeth 18 are provided on both sides of four chords of each leg 14. For smaller platforms, the leg members may consist of a single leg or leg chord with one or more tooth rack 18 thereon. Locking apparatuses 40 selectively lock the legs in position.

One pinion in the system, e.g. a drive pinion 32, has at least one (one shown) strain gauge 50 thereon for measuring load on the pinions 32 under static or dynamic conditions. The strain on a pinion shaft is indicative of the load on the jacking unit. This is also indicative of load on the corresponding leg—which is indicative of load on the platform. Knowing the strain and rate of rotation of the shaft also provides a measurement of the power consumed to rotate the shaft. A control system 54 which includes a control system 54*a* for each leg is in communication with each strain gauge 50, in one aspect via a slip ring assembly. The strain gauge(s) may be directly connected to the systems 54*a* with the systems including the devices etc. for communication with the strain gauge(s), along with the power consumed; optimally, each strain gauge can be connected to a junction box 58 which is in communication with the systems 54*a*. The control system 54 is also in communication with a jacking system console 56 with display 59 showing the load (in one aspect, in real time) on each pinion, e.g. a drive pinion 32. Since the control system is controlling the rate of rotation of the motor, this rate is inherent in the design of the system and available as a measured variable.

Figure 4:
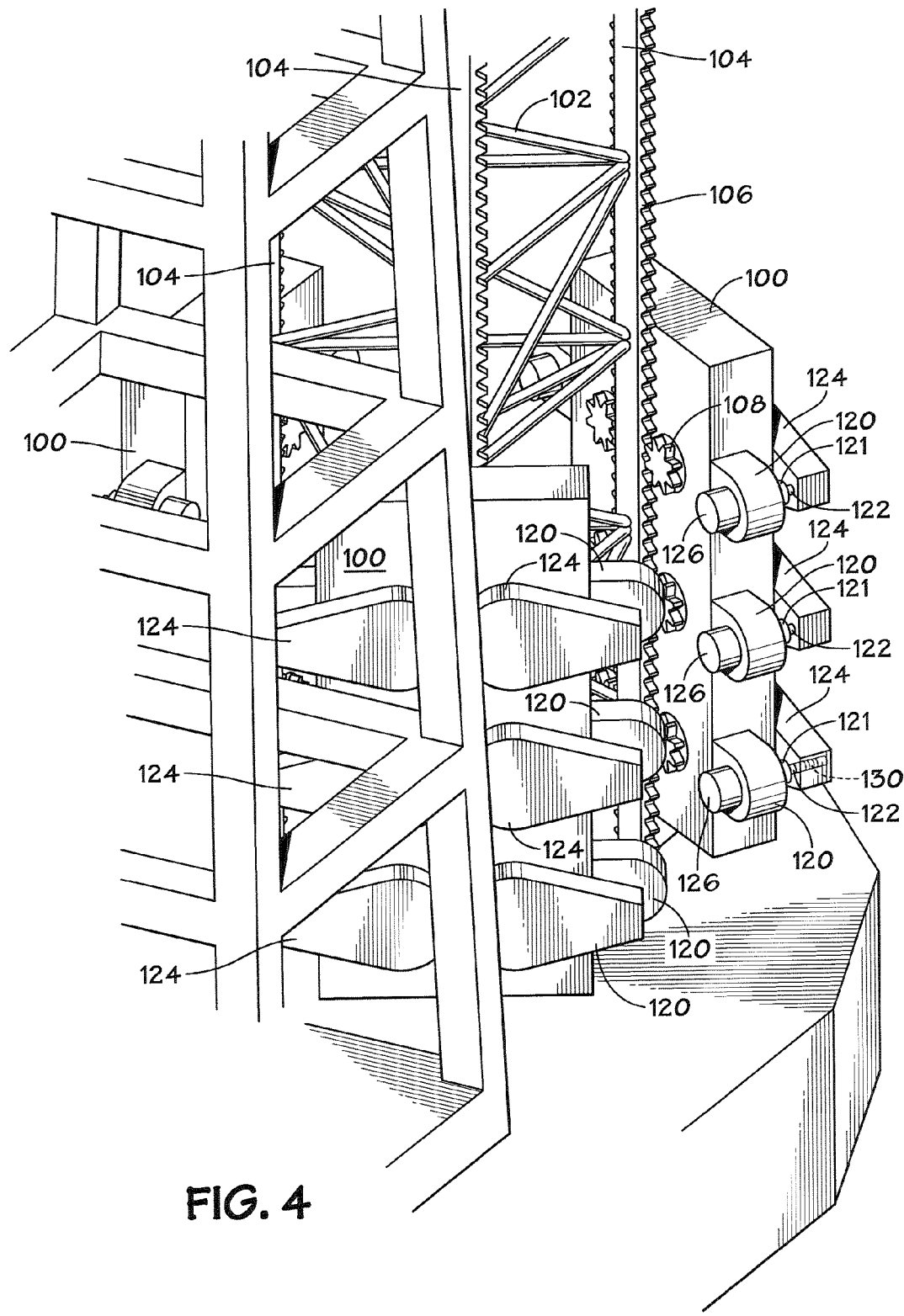
FIG. 4 is a partial enlarged perspective view of part of a rig leg and jacking unit according to the present invention.

FIG. 4 shows an enlarged view of part of a rig according to the present invention which includes a leg 102 (shown partially; e.g. like the legs 14, FIG. 1) with chords 104 each with a corresponding toothed rack 106. A jacking unit 100 (one for each chord) has spaced-apart climbing pinions 108 which mesh with a rack 106. Motors 120, via couplings 121, turn pinions 122 which turn additional mechanism (gears, pinions, etc; not shown in FIG. 4) in a gear train 124. Brakes 126 provide selective braking for the motors 120. Each pinion 122 has at least one strain gauge 130 thereon (like the strain gauges 50, FIG. 3) which, is in communication with suitable junction box(es) and/or control system(s). (Two, three, four or more strain gauges may be used as is true for any pinion or shaft of any embodiment according to the present invention.) Other measurements, such as the motor's power consumption, may also be transmitted.

Figure 5:
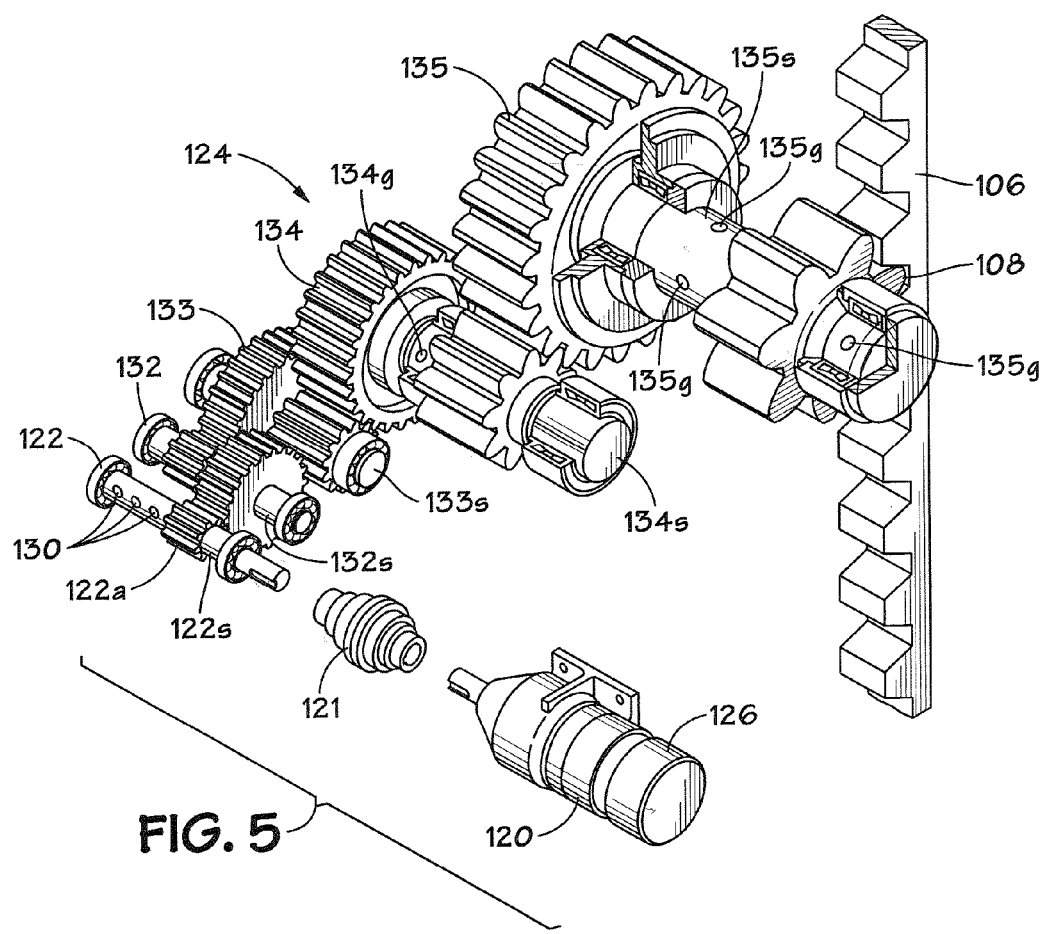
FIG. 5 is a partial view of part of the gear train of the unit of FIG. 4.

FIG. 5 shows an exploded view of some parts of one embodiment of a jacking unit 100 and of a gear train 124. The motor 120 drives the pinion 122 whose gear 122*a* on a shaft 122*s* meshes with a gear of an adjacent pinion assembly 132, and so on for additional pinion assemblies 133, 134 and 135 each with corresponding gears.

Each pinion assembly 132-135 has gears for meshing with adjacent assemblies and a shaft (132*s*-135*s*, respectively) on which the gears are mounted. Any and all shafts of any and all pinion assemblies may have one, two, three, four or more strain gauges thereon (like the strain gauges 50 or 130) in communication with a suitable junction box and/or control system. As an example, and not by way of limitation, a strain gauge 134*g* is shown on the shaft 134*s* and strain gauges 135*g* are shown on the shaft 135*s*. It is within the scope of the present invention to use any suitable motor and any suitable gear train to drive the climbing pinions 108. The gears and shafts of the gear train are under load unless the rig or platform has separate structures for holding the legs fixed in position.

Figure 6:
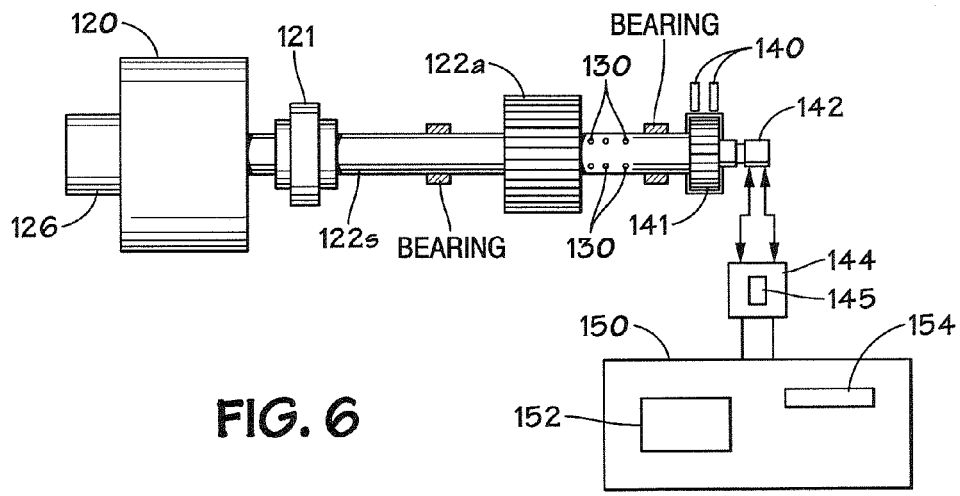
FIG. 6 is a schematic view of the unit of FIG. 4.
Figure 6C:
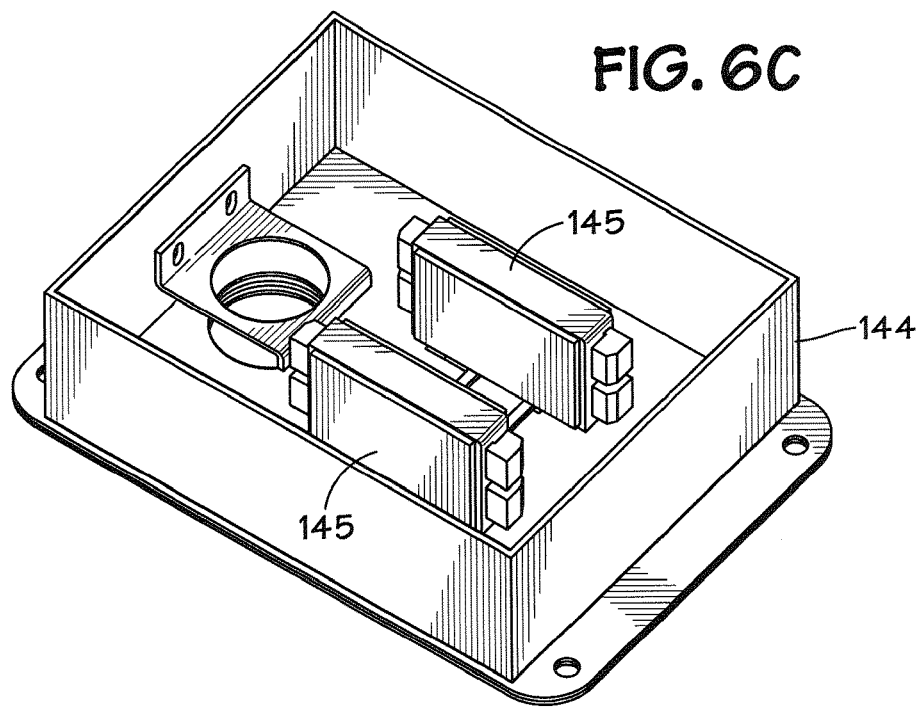
FIG. 6C is a perspective view of part of the system of FIG. 6.
Figure 6D:
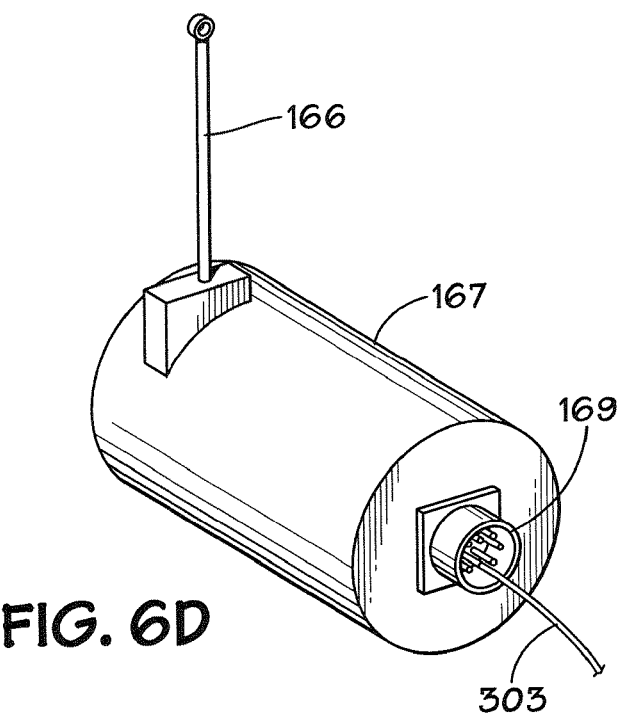
FIG. 6D is a perspective view of part of the system of FIG. 6.

FIG. 6 shows schematically parts of the system as shown in FIGS. 4 and 5. The strain gauges 130 are connected to a slip ring 142 sending the signal to signal conditioner/transmitters 145 within a junction box 144 (see FIG. 6C). The signal transmitters 145 convert the signal coming from the slip ring 142 into an output that travels through the junction box 144 to a programmable logic controller ("PLC") the output of which may include numerical, graphical and/or alarm signals that may be directed to display devices on the rig and/or to a main console of the platform. A system (e.g. the system 150 with one or more programmable logic controllers 154) receives signals from the signal conditioner/transmitters 145 which receive signals from the strain gauges 130 (in one aspect, sixteen strain gauges are used spaced apart around the shaft). A rotation sensor apparatus (e.g. 140 or 210, FIG. 8) detects marks, ridges, or indentations 141 on the shaft providing an indication of rotation direction and the number of rotations of the shaft 122*s*. This rotation, being part of the gear train, is directly proportional to the rotation on the pinion 108 (see FIG. 5) which translates into the linear displacement of the rack 106 with respect to the platform 12 (FIG. 1) and, therefore, the signal, translated into a linear dimension, is sent to the display 152 (or display 59, FIG. 3) as is compared against other similar readings from the other jack units on the rig, which may give indication of any rack path differential among all chords on the rig. The slip ring assembly 142 sends signals, via the junction box 144, to the control system 150. Results based on strain gauge output and/or rotation sensor output are displayed on an optional display 152.

A jacking unit 100 can move slightly with respect to its corresponding rack (and leg), both up and down and at an angle away from horizontal (e.g. two degrees). In one aspect, the jacking units 100 are mounted between shock pads 162 and 164 in a housing 161 to provide a small "float" distance between the jacking units and the rig deck 170. To measure this movement (the float distances), one, two, or more position transducer assemblies 165 (which can measure the distance between two points) are placed between the deck 170 and the jack unit 100. The assembly 165 has, in one aspect, a spring loaded, cable-actuated, digital, displacement transducer that is attached to the deck or the jack unit while the cable end is attached to the opposite part (the deck 170 or the jack unit 100); and as the cable 166 attached at point 163 is pulled out or retrieved into the transducer (see FIG. 6B), the distance is measured and a signal representative of the measurement is transmitted combined with that of the rotation sensor apparatus 140, described above, resulting in the measurement of the actual displacement between the platform and the leg chords. Cables 166 are connected to position transducer assemblies 167 which provides signals indicative of jacking unit position (and, therefore, over time of any jacking unit movement), to the control system (e.g. system 150 or 54) either directly or via a junction box. The position transducer assemblies 167 have an input/output connection 169 (e.g. for cables 303, see FIG. 10). The amount of extension of a cable 166 indicates the relative position of the jacking unit with respect to the frame.

Figure 7:
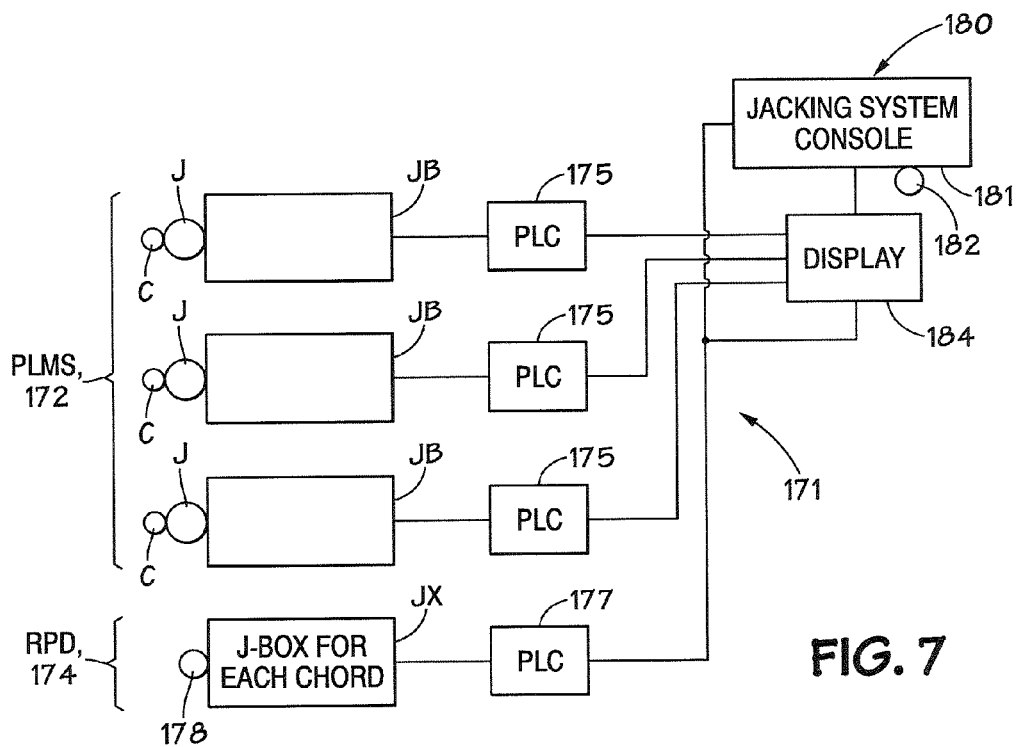
FIG. 7 is a schematic view of a system according to the present invention.

FIG. 7 illustrates schematically a monitoring system 171 according to the present invention for monitoring loads on pinion shafts of a gear train of a jacking unit of a rig and for monitoring rack path differential according to the present invention. Since the load (strain) on the platform, its legs, and the legs' jacking units is transferred to the jacking unit's gear train (the pinions of the gear train are always under the load), measuring the load on a shaft of a pinion of the gear train provides an indication of the load on the legs and on the platform. The strain gauges on a pinion shaft provide a signal indicative of load in both static and dynamic conditions. The signals from the strain gauges, transmitted to the control system, can, after processing by the control system, result in a warning or an alarm.

As shown in FIG. 7, for the load monitoring function 172, each jacking unit J for chords C has a corresponding junction box JB in communication with a corresponding programmable logic controller (PLC) 172 (or multiple PLC's are used). Three jacking units J are shown for a three chord leg. (There are, e.g., four units per leg in other systems according to the present invention.) Since the driving pinions of the gear train are always engaged with corresponding racks, displacement (movement) of the racks, and therefore of the legs, can be detected by monitoring rotation of a pinion shaft of the gear train. The amount of rotation, and its direction, can be measured by using a system 174 with a set 178 of proximity sensors adjacent a shaft for detecting ridges and/or depressions on the rotating shaft (or placed near the gears' teeth, and protected from oil or other lubricants). Each system 178 is in communication with a programmable logic controller 177 via a junction box JX. Numeral 171, FIG. 7, indicate the load monitoring system.

A real-time display of load measurements and leg displacement measurements is provided on a display 184. By maintaining in the PLC's, or in other storage devices, or in a control system 180 with a jacking system console 181, a log of the measurements over time, previous measurements can be accessed and displayed. Warnings and/or alarms are provided via alarm apparatus 182 (e.g. audio, visual or both).

Figure 8:
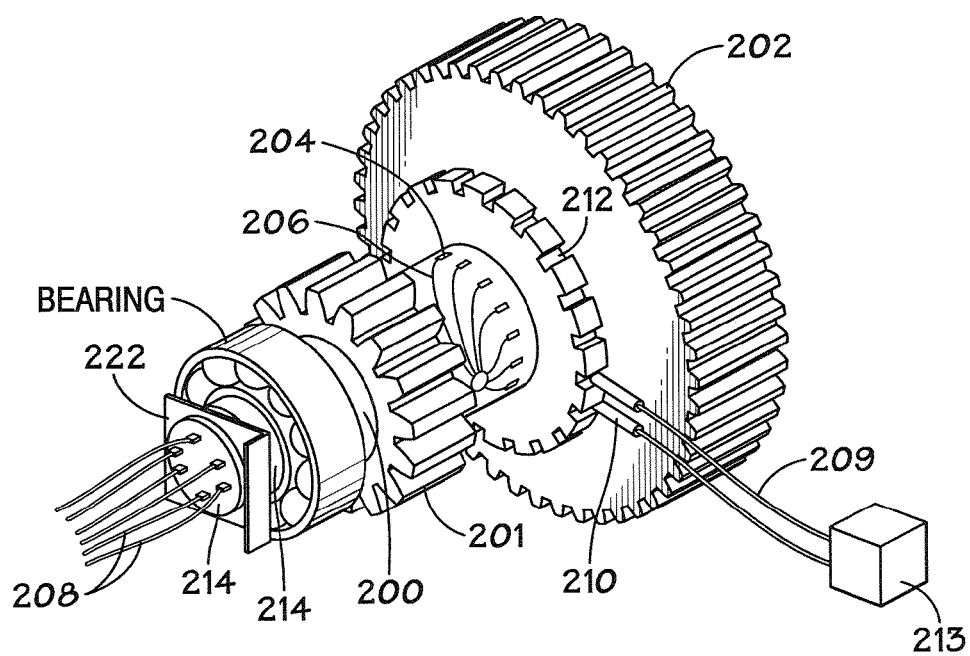
FIG. 8 is a schematic view of a system according to the present invention.
Figure 9:
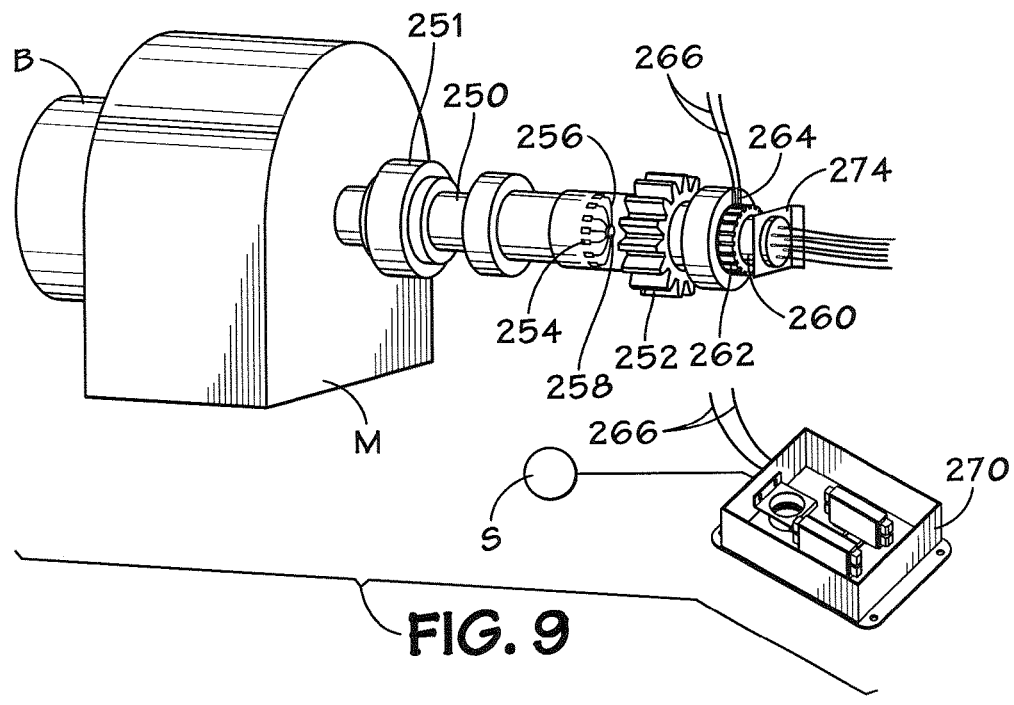
FIG. 9 is a schematic view of a system according to the present invention.

FIGS. 8 and 9 illustrate schematically different methods and structures according to the present invention for measuring strain on a rotating shaft and for measuring rotation of the shaft. As shown in FIG. 8 a shaft 200 (e.g. any shaft of a jacking unit's gear train) has two spaced-apart gears 201, 202 secured thereto. Strain gauges 204 are spaced-apart around the entire circumference of the shaft 200 between the gears 201, 202 (in an area which is a torque affected area, i.e. an area in which the torque produces a twisting on the shaft and the resulting strain is read by the strain gauges 204). Wires 206 from the strain gauges 204 are secured to the exterior of the shaft 200 (e.g. with an adhesive, e.g. epoxy) and are connected to an input of a slip ring 214 and then to output wires 208 which are then connected to a junction box (or boxes), not shown (e.g. like that of FIG. 3). A rotation sensor device 210 senses notches 212 in the shaft 200 (or, optionally, senses the spacing of gear teeth of any gear on the shaft) and transmits signals indicative of shaft rotation based on such sensing via a wire 209 to a signal transducer 213 in a junction box. The wires connected to the slip ring connect the slip ring 214 to a control system (e.g. via a junction box). Optionally, notches, indentations, depressions or ridges on a gear are sensed by the rotation sensor. A holding bracket 222 holds the slip ring in place.

As shown in FIG. 9 a shaft 250 of a motor M (like the motor 120, FIG. 4) has a gear 252 secured thereto with a series of spaced-apart strain gauges 254 around the shaft 250. Wires 256 from the strain gauges 254 go through holes 258 to a slip ring 260. Notches 262 on the shaft 250 are sensed by a rotation sensor device 264. Output wires from the rotation sensor device 264 are connected to a junction box 270 which is in communication with a control system S (any described herein). A holding bracket 274 holds a static end of the slip ring 260 in place. The torque affected area for the shaft 250 is the area between a coupling 251 and the gear 252. The motor M has a brake B (like the brake 126, FIG. 4).

Figure 10:
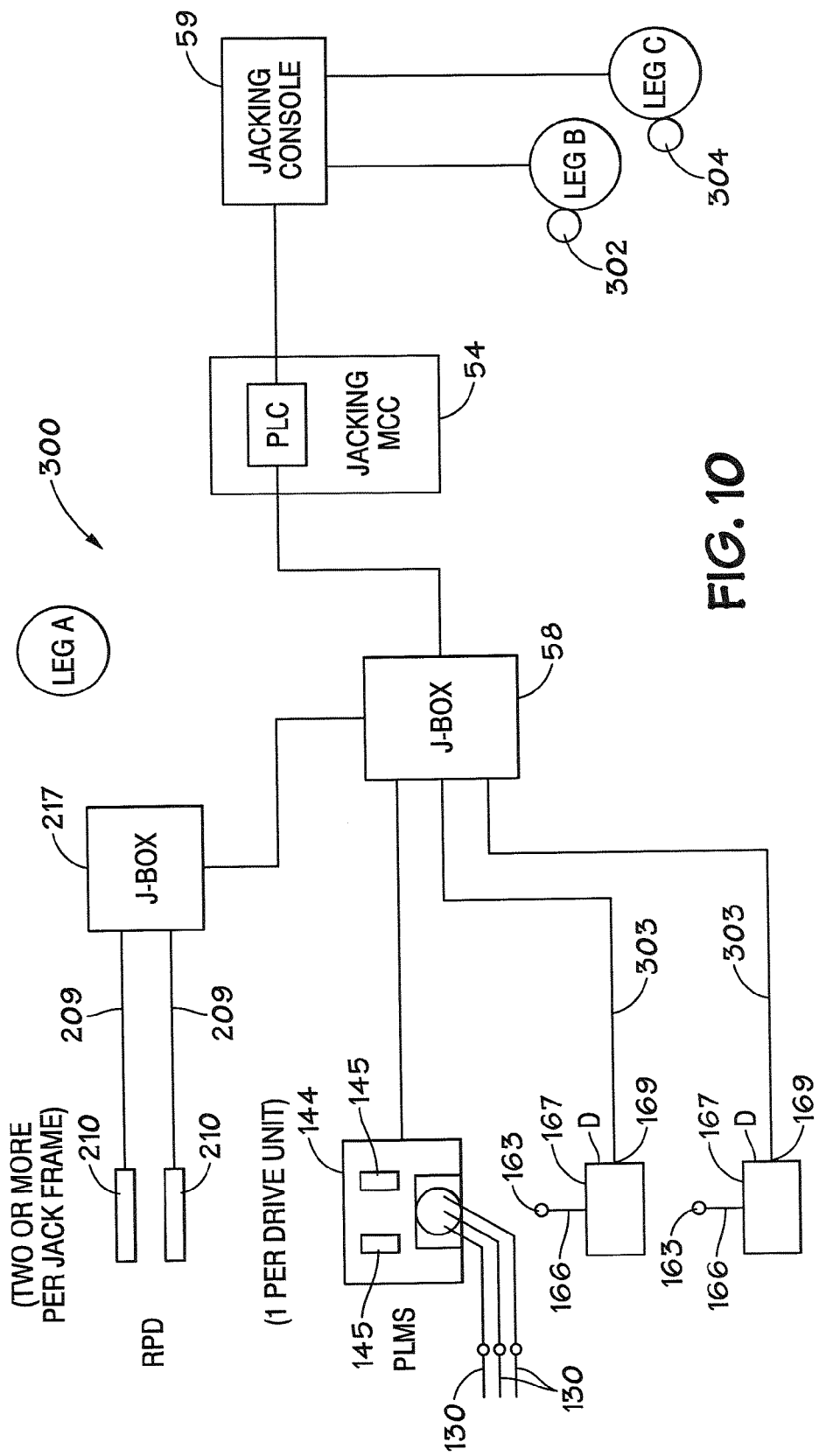
FIG. 10 is a schematic view of a system according to the present invention.

FIG. 10 shows a system 300 according to the present invention for a Leg A of a platform that has three legs, Legs A, B, C. The system 300 includes parts, devices and components identified with numerals indicating the same parts, etc. described above and identified with these same numerals. Legs B and C each have a system like the system 300-system 302 (Leg B) and system 304 (Leg C).

The present invention, therefore, provides in at least certain embodiments, a method for monitoring legs of an oilfield platform, the platform having a plurality of legs, each leg with a plurality of chords, each chord with a corresponding rack, the platform including a rack-and-pinion leg jacking system with a motor and gear system with pinions for each leg for jacking the legs up, the method including providing a load monitor of each leg with a strain sensing apparatus on a selected pinion of the rack-and-pinion system, said selected pinion associated with a particular leg of the platform, and providing a rack path differential monitoring system for monitoring rotation of each selected pinion to provide an indication of a linear displacement of the selected pinions and the legs associated therewith for comparison to indicate rack path differential for racks of the legs of the platform.

The present invention discloses in some, but not necessarily all, embodiments a method for monitoring a load on a chord of a leg of an oilfield platform, the leg with a plurality of chords, each chord with a corresponding toothed rack, each leg having a rack-and-pinion leg jacking system for jacking the leg up or down, each rack-and-pinion leg jacking system with a motor, gear system with pinions, and a climbing pinion for meshing with a leg's toothed rack, the method including: providing for a selected chord at least one strain sensing apparatus on a selected pinion of the rack-and-pinion system associated with the selected chord; with the at least one strain sensing apparatus, sensing strain on the selected pinion, said strain indicative of load on the selected chord and on the selected chord's associated leg, and producing a signal indicative thereof; and transmitting said signal to a control system, and processing said signal producing a value of a load on the selected chord. Such a method may have one or some of the following in any possible combination: wherein the at least one strain sensing apparatus is a plurality of strain gauges; measuring load on multiple pinions of the rack-and-pinion leg jacking system; displaying on a display a load measurement for the selected chord; wherein load measurement is displayed in real time.

The present invention discloses in some, but not necessarily all, embodiments a method for monitoring load on legs of an oilfield platform, the platform having a plurality of legs, each leg with a plurality of chords, each chord with a corresponding toothed rack, a rack-and-pinion leg jacking system for each chord for jacking the legs up and down, each rack-and-pinion leg jacking system with at least one drive unit, each of the at least one drive unit having a motor, gear system with pinions, and a climbing pinion for meshing with a corresponding toothed rack, the method including: providing a load monitor of each chord with at least one strain sensing apparatus on a selected pinion of a rack-and-pinion system leg jacking system of each chord, including a selected pinion for each of the at least one drive unit of each rack-and-pinion leg jacking system; with each said load monitor's at least one strain sensing apparatus, sensing strain on all the selected pinions, said strains indicative of load on the associated chord, and producing a signal indicative thereof for each chord of the leg; transmitting said signals to a control system, and processing said signals producing a value of load on each leg; within the control system, comparing said value to a specified value; and if said specified value is exceeded, producing an alarm for a system operator; wherein the at least one strain sensing apparatus is a plurality of strain gauges; wherein the alarm is one of visual alarm and sound alarm;

displaying on a display load measurements for each drive and/or for each leg; wherein load measurements for each leg are displayed in real time; maintaining an historical record of load measurements for each leg; and with the control system, providing access to the historical load measurements; wherein the control system includes, for each leg, a programmable logic controller for processing signals indicative of load; each programmable logic controller of a particular leg in wired communication with the at least one strain sensing apparatus of each chord of said leg, processing the signals indicative of load with the programmable logic controllers; maintaining an historical record of all signals and/or load measurements for each chord and/or leg; and with the control system, providing access to the historical load measurements; measuring vertical displacement of each leg jacking system in relation to the oilfield platform using a distance measuring device; providing a rack path differential monitoring system for monitoring rotation of each selected pinion to provide an indication of a linear displacement of each selected pinion of each chord and the leg associated therewith for comparison to indicate rack path differential for the legs of the platform; wherein the oilfield platform has a deck, the method further including detecting relative position of each chord with respect to the deck to thereby identify possible twisting of each leg; wherein each rack has associated therewith a measurement apparatus for measuring actual displacement between each chord and the platform, the method further including providing a signal from each measurement apparatus to an associated programmable logic controller of the control system for determining the displacement between each chord and the platform; providing a display in real time of displacement between each chord and the platform; maintaining in the control system a second historical record of said displacements; and/or with the control system, providing access to the second historical record.

The present invention discloses in some, but not necessarily all, embodiments a method for monitoring load on legs of an oilfield platform, the platform having a plurality of legs, each leg with a plurality of chords, each chord with a corresponding toothed rack, a rack-and-pinion leg jacking system for each chord jacking the legs up and down, each rack-and-pinion leg jacking system a plurality of drive units, each drive unit with a motor, gear system with pinions, and a climbing pinion for meshing with a corresponding toothed rack, the method including providing a load monitor of each drive unit of each chord with at least one strain sensing apparatus on a selected pinion of each drive unit of each rack-and-pinion leg jacking system of each chord; with each strain sensing apparatus, sensing strain on the selected pinion, said strain indicative of a load on the associated leg and producing a signal indicative thereof related to each drive unit of each chord; transmitting said signals to a control system, and processing said signals to produce a value of load on each leg and a total load value for a platform load comprising total load on the platform; displaying in real time on a display any sensed load and/or the platform load and/or measurements for each leg; within the control system, comparing said values to specified values for each leg and for the platform, if said specified value is exceeded for any individual leg or for total platform load, producing an alarm for a system operator; wherein the at least one strain sensing apparatus is a plurality of strain gauges; maintaining a first historical record of load measurements for each leg and for platform load, with the control system, providing access to the first historical load record, the control system including, for each leg, a programmable logic controller for processing signals indicative of load, each programmable logic controller in wired communication with the at least one strain sensing apparatus, processing the signals indicative of load with the programmable logic controllers, providing a rack path differential monitoring system for indicating rack path differential for the toothed racks of the legs of the platform, wherein the oilfield platform has a deck, detecting relative position of each chord with respect to the deck to thereby identify possible twisting of each leg, providing a display in real time of displacement between each chord and the platform, maintaining in the control system a second historical record of displacements between each chord and the platform, and with the control system, providing access to the second historical record.

The present invention discloses in some, but not necessarily all, embodiments a system for monitoring load on a chord of a leg of an oilfield platform, the chord with a corresponding toothed rack, a rack-and-pinion leg jacking system for the chord for jacking the leg up and down, the rack-and-pinion leg jacking system with a plurality of drive units, each drive unit having a motor, a gear system with pinions, and a climbing pinion for meshing with the toothed rack, the system including: a load monitor for each drive unit with at least one strain sensing apparatus on a selected pinion of each drive unit, for sensing strain on the selected pinion, said strain indicative of load on the associated chord and producing a signal indicative thereof; a control system; transmission apparatus for transmitting said signal to the control system; and the control system for processing said signal to produce a value of load on said chord.

The present invention discloses in some, but not necessarily all, embodiments a system for monitoring legs of an oilfield platform, the platform having a plurality of legs, each leg with a plurality of chords, each chord with a corresponding toothed rack, a rack-and-pinion leg jacking system for each chord for jacking the legs up and down, each rack-and-pinion leg jacking system with a plurality of drive units, each drive unit with a motor, gear system with pinions, and a climbing pinion for meshing with a toothed rack of a chord, the system including: a load monitor of each drive unit with at least one strain sensing apparatus on a selected pinion of the drive unit for sensing strain on the selected pinion, said strain indicative of load on the associated chord and producing signals indicative thereof; a control system; transmission apparatus for transmitting said signals to the control system; the control system for processing said signals to produce a value of leg load on each leg and platform load on the platform; and said control system for comparing said values to specified values for leg load and for platform load, and if any specified value is exceeded for either leg load or for platform load, the control system for producing an alarm for a system operator. Such a system may have one or some any possible combination of the following: the at least one strain sensing apparatus is a plurality of strain gauges; the control system includes, for each leg, a programmable logic controller for processing signals indicative of load, each programmable logic controller in wired communication with all strain sensing apparatus for a corresponding leg, and the programmable logic controllers for processing the signals indicative of load; rack path differential monitoring apparatus for detecting relative position of each chord within respect to a deck of the oilfield platform to thereby identify possible twisting of each leg, and for providing a signal from each measurement apparatus to an associated programmable logic controller of the control system for determining the displacement between each chord and the platform; and/or maintaining in the control system an historical record of displacements between each chord and the platform, and the control system for providing access to the historical record.

In conclusion, therefore, it is seen that the present invention and the embodiments disclosed herein and those covered herein are well adapted to carry out the objectives and obtain the ends set forth. Certain changes can be made in the subject matter without departing from the spirit and the scope of this invention. It is realized that changes are possible within the scope of this invention and it is further intended that each element or step recited herein is to be understood as referring to the step literally and/or to all equivalent elements or steps. It is intended to cover the invention as broadly as legally possible in whatever form it may be utilized. The inventors may rely on the Doctrine of Equivalents to determine and assess the scope of their invention as it may pertain to apparatus not materially departing from, but outside of, the literal scope of the invention. All patents and applications identified herein are incorporated fully herein for all purposes.

Whereas the present invention has been described in particular relation to the drawings attached hereto, it should be understood that other and further modifications apart from those shown or suggested herein, may be made within the scope and spirit of the present invention.

What is claimed is:

1. A method for monitoring a load and power consumption to raise a chord of one of a plurality of legs of an oilfield platform, each of the plurality of legs with a plurality of chords, each of the plurality of chords with a corresponding toothed rack, each of the plurality of legs having a rack-and-pinion leg jacking system for jacking a corresponding one of the plurality of legs up or down, each rack-and-pinion leg jacking system with a motor, gear system with pinions, and a climbing pinion for meshing with a leg's toothed rack, the method comprising:
   providing for a selected chord of the plurality of chords at least one strain sensing apparatus on a selected pinion of the rack-and-pinion system associated with the selected chord, with the at least one strain sensing apparatus, sensing strain on the selected pinion, said strain indicative of load on the selected chord and on the selected chord's associated leg;
   sensing power consumption and producing a signal indicative thereof;
   transmitting said signals to a control system;
   processing said signal producing a value of a load and power measurement on the selected chord.

2. The method of claim 1 wherein the at least one strain sensing apparatus is a plurality of strain gauges.

3. The method of claim 1 further comprising measuring load and power simultaneously on multiple pinions of the rack-and-pinion leg jacking system.

4. The method of claim 1 further comprising displaying on a display load and power measurements for the selected chord.

5. The method of claim 4 wherein the load and power measurements are displayed in real time.

6. A method for monitoring load on a plurality of legs of an oilfield platform, each leg with a plurality of chords, each chord with a corresponding toothed rack, a rack-and-pinion leg jacking system for each chord for jacking the plurality of legs up and down, each rack-and-pinion leg jacking system with at least one drive unit, each of the at least one drive unit having a motor, gear system with pinions, and a climbing pinion for meshing with a corresponding toothed rack, the method comprising:
   providing a load monitor of each chord with at least one strain sensing apparatus on a selected pinion of the rack-and-pinion leg jacking system of each chord, comprising a selected pinion for each of the at least one drive unit of each of the rack-and-pinion leg jacking system, with each said load monitor's at least one strain sensing apparatus;
   sensing strain on all the selected pinions, said strains indicative of load on the associated chord;
   producing a signal indicative thereof for each of the plurality of chords of the plurality of legs;
   sensing power consumption thereof for each of the plurality of chords of the plurality of legs;
   transmitting all said signals to a control system;
   processing said signals producing load and power measurements for consumption on each of the plurality of legs;
   within the control system, comparing said value to a specified value; and
   if said specified value is exceeded, producing an alarm for a system operator.

7. The method of claim 6 wherein the at least one strain sensing apparatus is a plurality of strain gauges.

8. The method of claim 6 wherein the alarm is one of visual alarm and sound alarm.

9. The method of claim 6 further comprising displaying on a display load measurements for each of the plurality of legs.

10. The method of claim 9 wherein the load measurements for each of the plurality of legs are displayed in real time.

11. The method of claim 10 further comprising maintaining a historical record of load and power measurements for each of the plurality of legs, and with the control system, providing access to the historical load and power measurements.

12. The method of claim 6 wherein the control system comprises, for each leg, a programmable logic controller for processing signals indicative of load, each programmable logic controller of a particular one of the plurality of legs in wired communication with the at least one strain sensing apparatus of each of the plurality of chords of said one leg, the method further comprising processing the signals indicative of load and/or power with the programmable logic controllers.

13. The method of claim 12 further comprising maintaining an historical record of load and power measurements for each of the plurality of legs, and with the control system, providing access to the historical load measurements.

14. The method of claim 6, the method further comprising measuring vertical displacement of each leg jacking system in relation to the oilfield platform using a distance measuring device.

15. The method of claim 6 further comprising providing a rack path differential monitoring system for monitoring rotation of each selected pinion to provide an indication of a linear displacement of each selected pinion of each chord and the leg associated therewith for comparison to indicate rack path differential for the plurality of legs of the platform.

16. The method of claim 6 wherein the oilfield platform has a deck, the method further comprising detecting relative position of each of the plurality of chord with respect to the deck to thereby identify possible twisting of each of the plurality of legs.

17. The method of claim 16 wherein each rack has associated therewith a measurement apparatus for measuring actual displacement between each of the plurality of chords and the platform, the method further comprising providing a signal from each measurement apparatus to an associated programmable logic controller of the control system for determining the displacement between each of the plurality of chords and the platform.

18. The method of claim 17 further comprising providing a display in real time of displacement between each of the plurality of chords and the platform.

19. The method of claim 16 further comprising maintaining in the control system a second historical record of said displacements, and with the control system, providing access to the second historical record.

20. A method for monitoring load on a plurality of legs of an oilfield platform, each of the plurality of legs with a plurality of chords, each of the plurality of chords with a corresponding toothed rack, a rack-and-pinion leg jacking system for each chord jacking the plurality of legs up and down, each rack-and-pinion leg jacking system having a plurality of drive units, each drive unit with a motor, gear system with pinions, and a climbing pinion for meshing with a corresponding toothed rack, the method comprising
- providing a load monitor of each drive unit of each of the plurality of chords with at least one strain sensing apparatus on a selected pinion of each drive unit of each of the rack-and-pinion leg jacking system of each of the plurality of chords;
- with each strain sensing apparatus, sensing strain on the selected pinion, said strain indicative of a load on an associated leg and producing a signal indicative thereof related to each drive unit of each of the plurality of chords;
- transmitting said signals to a control system;
- processing said signals to produce values of load and power on each of the plurality of legs and a total load value for a platform load comprising total load on the platform;
- displaying in real time on a display the platform load measurements for each of the plurality of legs;
- within the control system, comparing said values to specified values for each of the plurality of legs and for the platform;
- if said specified valve is exceeded for any individual leg of the plurality of legs or for total platform load, producing an alarm for a system operator;
- wherein the at least one strain sensing apparatus is a plurality of strain gauges;
- maintaining a first historical record of load and power measurements for each of the plurality of legs and for platform load, with the control system;
- providing access to the first historical load record, the control system comprising, for each of the plurality of legs, a programmable logic controller for processing signals indicative of load and power, each of the programmable logic controller in wired communication with the at least one strain sensing apparatus;
- processing the signals indicative of load with the programmable logic controllers;
- providing a rack path differential monitoring system for indicating rack path differential for the toothed racks of the plurality of legs of the platform, wherein the oilfield platform has a deck;
- detecting relative position of each chord with respect to the deck to thereby identify possible twisting of each of the plurality of legs;
- providing a display in real time of displacement between each of the plurality of chords and the platform;
- maintaining in the control system a second historical record of displacements between each of the plurality of chords and the platform; and
- with the control system, providing access to the second historical record.

21. A system for monitoring load on a chord of a leg of an oilfield platform, the system comprising
- a chord on a leg or an oilfield platform, the chord with a corresponding toothed rack;
- a rack-and-pinion leg jacking system for the chord for jacking the leg up and down, the rack-and-pinion leg jacking system with a plurality of drive units, each drive unit having a motor, a gear system with pinions, and a climbing pinion for meshing with the toothed rack;
- a load and a power monitor for each drive unit with at least one strain sensing apparatus on a selected pinion of each drive unit, for sensing strain on the selected pinion, said strain indicative of load on the associated chord and producing a signal indicative thereof, the load and power monitor for sensing power consumed during jacking; and
- a control system, transmission apparatus for transmitting said signal to the control system, the control system for processing said signal to produce a value of load on said chord.

22. A system for monitoring a plurality of legs of an oilfield platform, each of the plurality of legs with a plurality of chords, each of the plurality of chords with a corresponding toothed rack, a rack-and-pinion leg jacking system for each chord for jacking the plurality of legs up and down, each rack-and-pinion leg jacking system with a plurality of drive units, each drive unit with a motor, gear system with pinions, and a climbing pinion for meshing with a toothed rack of one of the plurality of chords, the system comprising
- a load monitor of each drive unit with at least one strain sensing apparatus on a selected pinion of the drive unit for sensing strain on the selected pinion, said strain indicative of load on an associated one of the plurality of chords, and sensing power consumed by the motor and producing signals indicative thereof; and
- a control system, transmission apparatus for transmitting said signals to the control system, the control system for processing said signals to produce a value of leg load on each of the plurality of legs and platform load on the platform, said control system for comparing said values to specified values for leg load and for platform load, and if said specified value is exceeded for either leg load or for platform load, the control system for producing an alarm for a system operator.

23. The system of claim 22 wherein the at least one strain sensing apparatus is a plurality of strain gauges.

24. The system of claim 22 wherein the control system includes, for each of the plurality of legs, a programmable logic controller for processing signals indicative of load, each programmable logic controller in wired communication with all strain sensing apparatus for a corresponding leg, and the programmable logic controllers for processing the signals indicative of load.

25. The system of claim 24 further comprising rack path differential monitoring apparatus for detecting relative position of each chord within respect to a deck of the oilfield platform to thereby identify possible twisting of each of the plurality of legs, and for providing a signal from each measurement apparatus to an associated programmable logic controller of the control system for determining the displacement between each of the plurality of chords and the platform.

26. The system of claim 25 further comprising maintaining in the control system an historical record of displacements between each of the plurality of chords and the platform, and the control system for providing access to the historical record.

* * * * *